United States Patent
Hu

(10) Patent No.: US 7,839,997 B2
(45) Date of Patent: Nov. 23, 2010

(54) CIRCUIT FOR PREVENTING UNAUTHORIZED ACCESS TO PHONES

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 486 days.

(21) Appl. No.: 12/060,861

(22) Filed: Apr. 1, 2008

(65) Prior Publication Data

US 2009/0103713 A1    Apr. 23, 2009

(30) Foreign Application Priority Data

Oct. 19, 2007    (CN) .................... 2007 1 0202139

(51) Int. Cl.
*H04M 1/00*    (2006.01)
*H04M 9/00*    (2006.01)

(52) U.S. Cl. .......................... 379/445; 379/35

(58) Field of Classification Search ............ 379/35, 379/445

See application file for complete search history.

(56) References Cited

U.S. PATENT DOCUMENTS 3,662,112 A * 5/1972 Martin ................. 379/40
6,002,747 A * 12/1999 Eftechiou ............ 379/35

* cited by examiner

*Primary Examiner*—Fan Tsang
*Assistant Examiner*—Phylesha Dabney
(74) *Attorney, Agent, or Firm*—Frank R. Niranjan

(57) ABSTRACT

An exemplary circuit for preventing unauthorized access to a phone includes three transistors, a zener diode, and a rectifier comprising two input terminals for receiving an AC voltage from the telecommunication office, a negative output terminal connected to the phone via a first resistor, and a positive output terminal connected to the phone. The anode and the cathode of the zener diode are respectively connected to the positive output terminal and the base of the first transistor. The collectors of the first and third transistors are connected to the base of the second transistor, which is connected to the positive and negative output terminals respectively via two capacitors. The collectors of the first and second transistors are connected to the positive output terminal respectively via a second resistor and a buzzer. Emitters of the three transistors are connected to the negative output terminal of the rectifier.

4 Claims, 1 Drawing Sheet

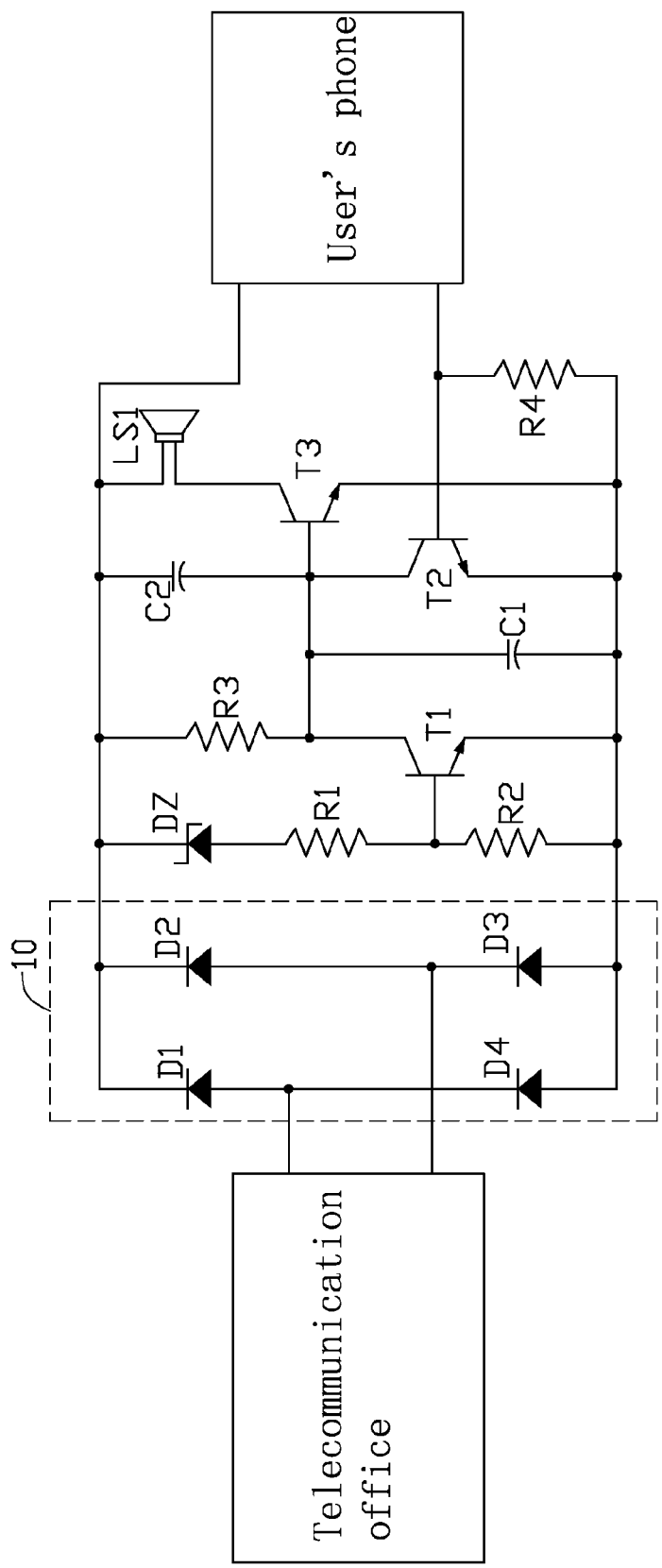

CIRCUIT FOR PREVENTING UNAUTHORIZED ACCESS TO PHONES

BACKGROUND

1. Field of the Invention

The present invention relates to phones, and particularly to a circuit for preventing unauthorized access to a phone.

2. Description of Related Art

Telephone communication apparatuses have become a means requisite for modern communication. Through telephone communication apparatus the transmission of information, market report, and commercial transactions can be made easily, rapidly and efficiently. Since telephone communication apparatus has now become so important in our daily lives, a telephone communication local line subscriber may suffer a loss if an unauthorized user illegally connects to the line.

What is needed is to provide a circuit for preventing a phone from unauthorized access.

SUMMARY

An exemplary circuit for preventing unauthorized access to a phone includes three transistors, a zener diode, and a rectifier comprising two input terminals for receiving an AC voltage from the telecommunication office, a negative output terminal connected to the phone via a first resistor, and a positive output terminal connected to the phone. The anode and the cathode of the zener diode are respectively connected to the positive output terminal and the base of the first transistor. The collectors of the first and third transistors are connected to the base of the second transistor, which is connected to the positive and negative output terminals respectively via two capacitors. The collectors of the first and second transistors are connected to the positive output terminal respectively via a second resistor and a buzzer. Emitters of the three transistors are connected to the negative output terminal of the rectifier.

Other novel features and advantages will become more apparent from the following detailed description of preferred and exemplary embodiments when taken in conjunction with the accompanying drawing, in which:

BRIEF DESCRIPTION OF THE DRAWINGS

The diagram represents a circuit used for preventing unauthorized access to a phone in accordance with an exemplary embodiment of the present invention.

DETAILED DESCRIPTION

Referring to the drawing, a circuit in accordance with an exemplary embodiment of the present invention includes a rectifier 10, a zener diode DZ, three transistors T1, T2 and T3, two capacitors C1, C2, four resistors R1, R2, R3, and R4, and a buzzer LS1 having the characteristics of an inductance. The transistors T1, T2 and T3 are NPN transistors. The rectifier 10 includes four diodes D1, D2, D3, and D4.

The cathodes of the diodes D1 and D2 are connected together, the anodes of the diodes D3 and D4 are connected together. The cathodes of the diodes D3 and D4 are respectively connected to the anodes of the diode D2 and D1. Functioning as two input terminals of the rectifier 10, the anodes of the diodes D1 and D2 receive an alternating current (AC) voltage from two local lines of the telecommunication office. Functioning as a positive output terminal of the rectifier 10, the cathode of the diode D1 is configured for connecting to the user's phone. Functioning as a negative output terminal of the rectifier 10, the anode of the diode D3 is configured for connecting to the user's phone via the resistor R4. The cathode of the zener diode DZ is connected to the cathode of the diode D1, the anode of the zener diode DZ is connected to the anode of the diode D3 via the resistors R1 and R2 (which are connected in series). A node between the resistors R1 and R2 is connected to the base of the transistor T1, the collector of the transistor T1 is connected to the cathode of the zener diode DZ via the resistor R3. The collectors of the transistors T1 and T2 are connected together, and connected to the base of the transistor T3. The collector of the transistor T3 is connected to the cathode of the zener diode DZ via the buzzer LS1. The emitters of the transistors T1, T2 and T3 are connected to the anode of the diode D3. The capacitor C1 is connected between the collector and the emitter of the transistor T1. The capacitor C2 is connected between the base of the transistor T3 and the cathode of the zener diode DZ. The capacitor C2 and the buzzer LS1 form an inductance-capacitor (LC) oscillator.

When the user's phone is free and local lines of the telecommunication office are not connected by an intruder, the voltage (AC voltage) value between the input terminals of the rectifier 10 is 50V. The rectifier 10 converts the AC voltage into direct current voltage, the zener diode DZ and transistor T1 are both turned on. The voltage value of the capacitor C1 is 0V. Because there is no voltage on the capacitor C2, the LC oscillator does not work, and the buzzer LS1 is off. When an unauthorized phone is connected between the local lines, the voltage value between the input terminals of the rectifier 10 is reduced to approximately 10V, the zener diode DZ and transistor T1 are turned off, the capacitor C1 is charged. When a voltage of the capacitor C1 is higher than 0.7V, the transistor T3 is turned on, the capacitor C2 is connected between the positive and negative output terminals of the rectifier 10, the voltage value of the capacitor C2 and the voltage value between the input terminals of the rectifier 10 begin increasing from approximately 0V. At this time, the unauthorized phone cannot function properly because the voltage between the input terminals of the rectifier 10 is too low. The capacitor C1 discharges to turn off the transistor T3, when the transistor T3 is turned off, the capacitor C2 discharges, the LC oscillator works, and the buzzer LS1 generates noise to disturb the communication of the intruders. Subsequently, the capacitor C1 is charged via the resistor R3 to turn on the transistor T3, and the cycle continues.

Usually, local lines can supply approximately 40 mA constant current to the load, when the user's telephone is busy, the transistor T2 is turned on through a voltage from the resistor R4, which is produced by the constant current via the rectifier 10, the resistor R3, and the capacitor C1. When the transistor T3 is off and the voltage of the capacitor C2 is 0V, the buzzer LS1 does not generate any noise. Therefore, the user could communicate with others normally.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A circuit for preventing unauthorized access to a phone, the circuit comprising:
   a rectifier comprising two input terminals for receiving an alternating current voltage from the telecommunication office, a positive output terminal connected to a first terminal of the phone, and a negative output terminal connected to a second terminal of the phone via a first resistor;
   a zener diode, the cathode of the zener diode is connected to the positive output terminal of the rectifier;
   a first transistor, the base of the first transistor is connected to the anode of the zener diode, the collector of the first transistor is connected to the cathode of the zener diode via a second resistor;
   a second transistor, the base and the collector of the second transistor are connected to the cathode of the zener diode respectively via a first capacitor and a buzzer, the buzzer has characteristics of an inductance; and
   a third transistor, the base of the third transistor is connected to the second terminal of the phone, the collector of the third transistor is connected to the collector of the first transistor, the base of the second transistor, and an end of a second capacitor; wherein
   emitters of the first, second and third transistors are all connected to the negative output terminal of the rectifier, the other end of the second capacitor is connected to the negative output terminal of the rectifier.

2. The circuit as claimed in claim 1, wherein the rectifier comprises first, second, third, and fourth diodes, the cathode of the first and second diodes are connected together, the anodes of the third and fourth diodes are connected together; the cathodes of the third and fourth diodes are respectively connected to the anodes of the second diode and the first diode; the anodes of the first and second diodes are respectively functioned as the two input terminals, the cathode of the first diode is functioned as the positive output terminal, and the anode of the third diode is functioned as the negative output terminal.

3. The circuit as claimed in claim 1, wherein the first, second, and third transistors are negative-positive-negative transistors.

4. The circuit as claimed in claim 1, further comprising a third resistor connected between the anode of the zener diode and the base of the first transistor, and a fourth resistor connected between the base and the emitter of the first transistor.

* * * * *